April 11, 1967  H. C. SIBLEY  3,313,933
INTEGRITY CHECK FOR HOT BOX DETECTOR
Filed Sept. 19, 1962  5 Sheets-Sheet 2

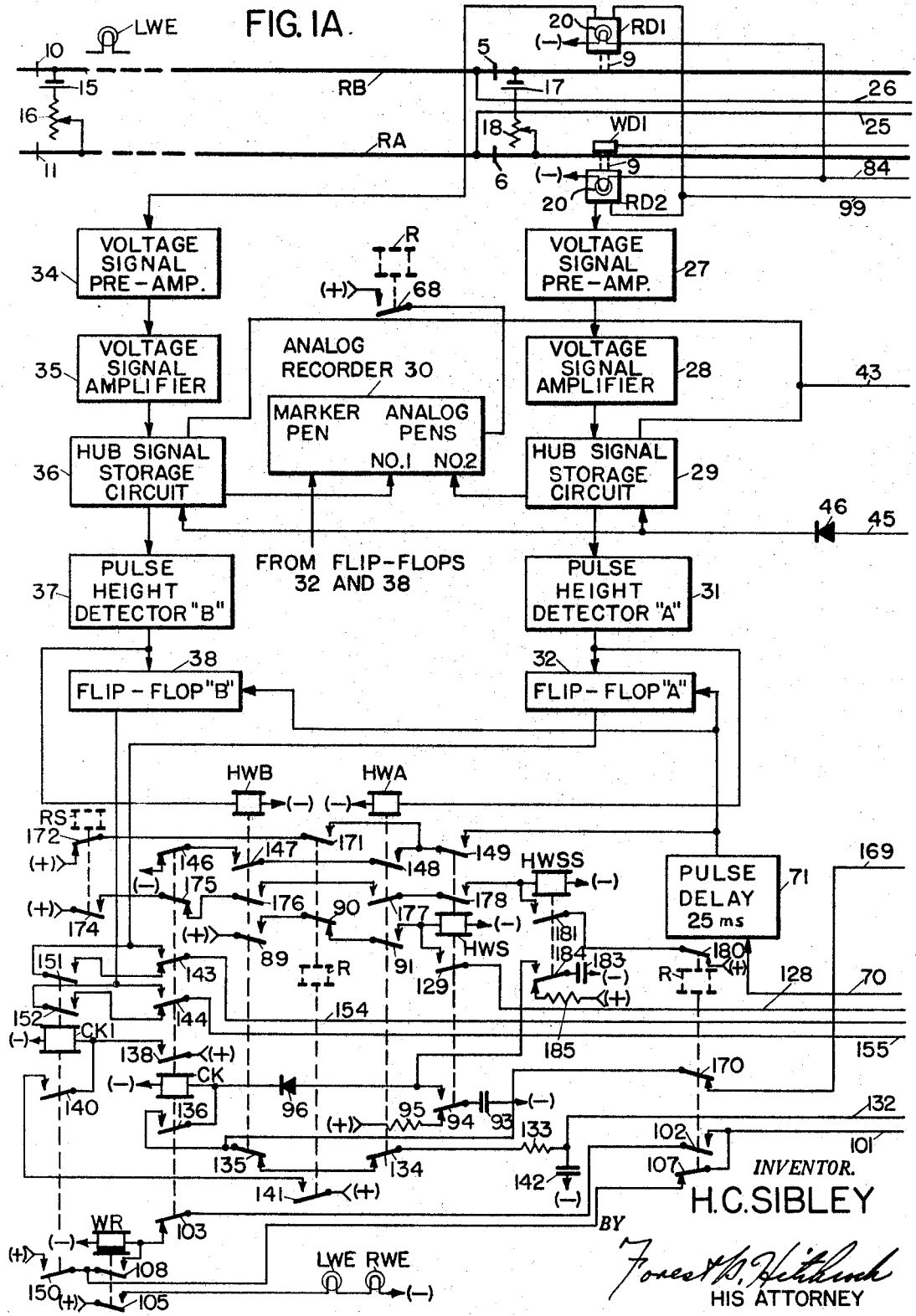

FIG. 1B

INVENTOR.
H. C. SIBLEY
BY
Forest B. Hitchcock
HIS ATTORNEY

April 11, 1967 H. C. SIBLEY 3,313,933
INTEGRITY CHECK FOR HOT BOX DETECTOR
Filed Sept. 19, 1962 5 Sheets-Sheet 3
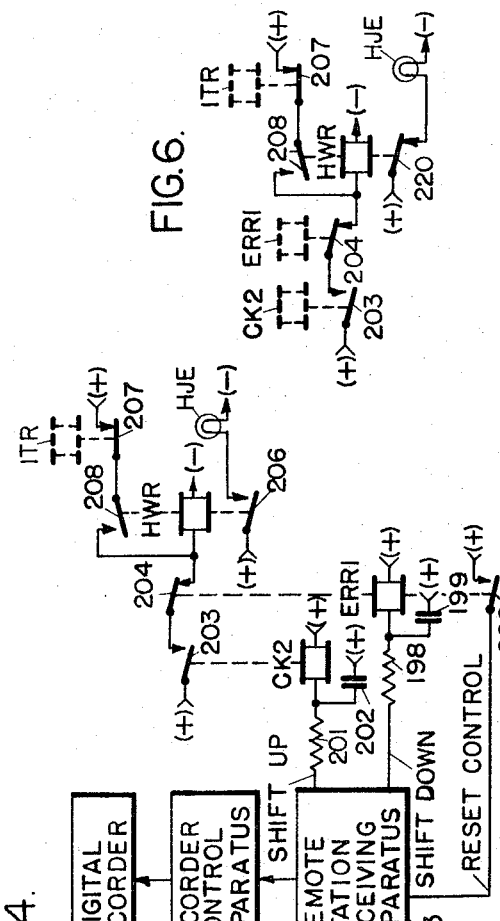
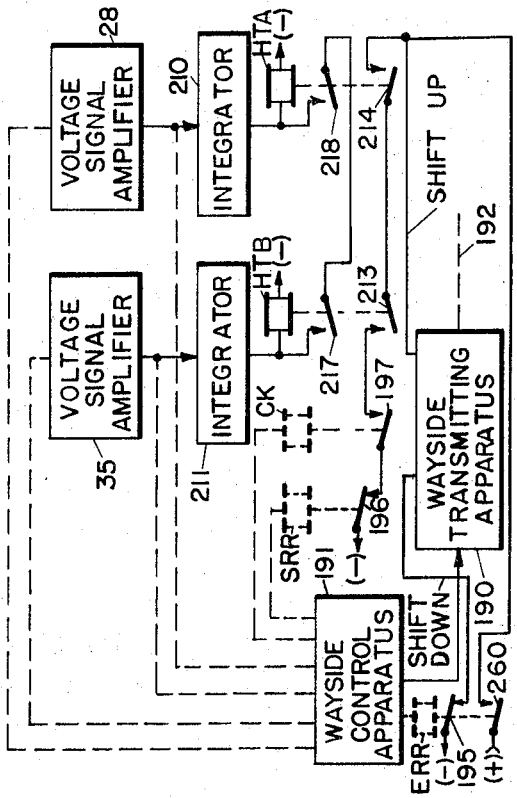
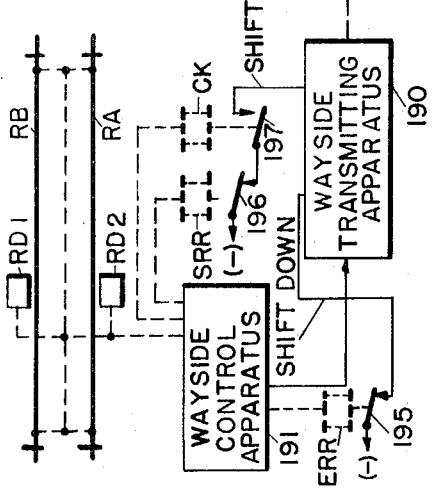
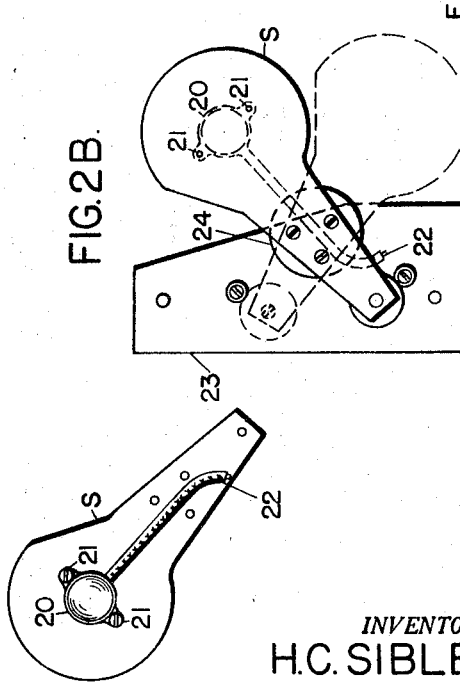
INVENTOR.
H.C. SIBLEY
BY
Forest B. Hitchcock
HIS ATTORNEY

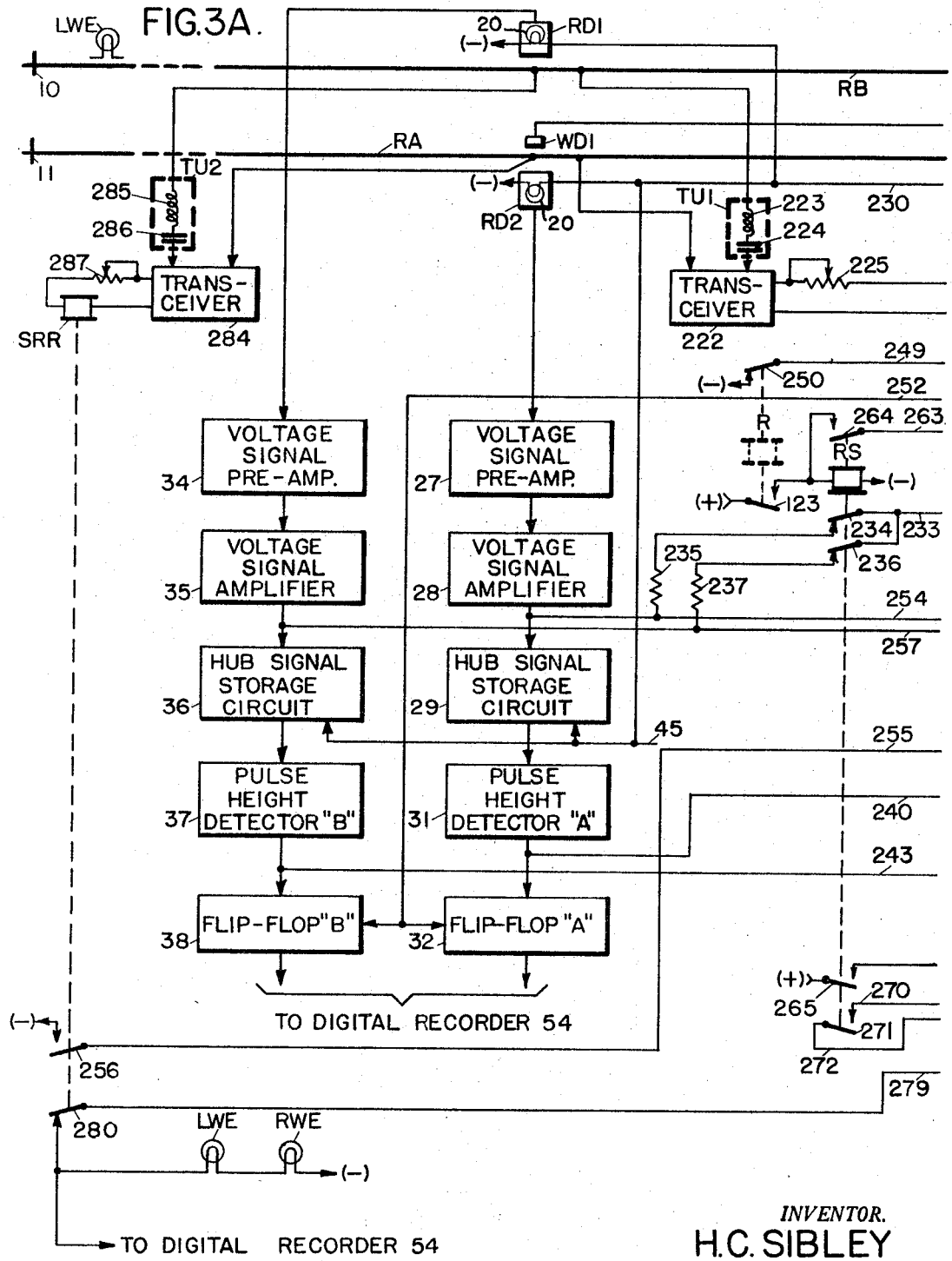

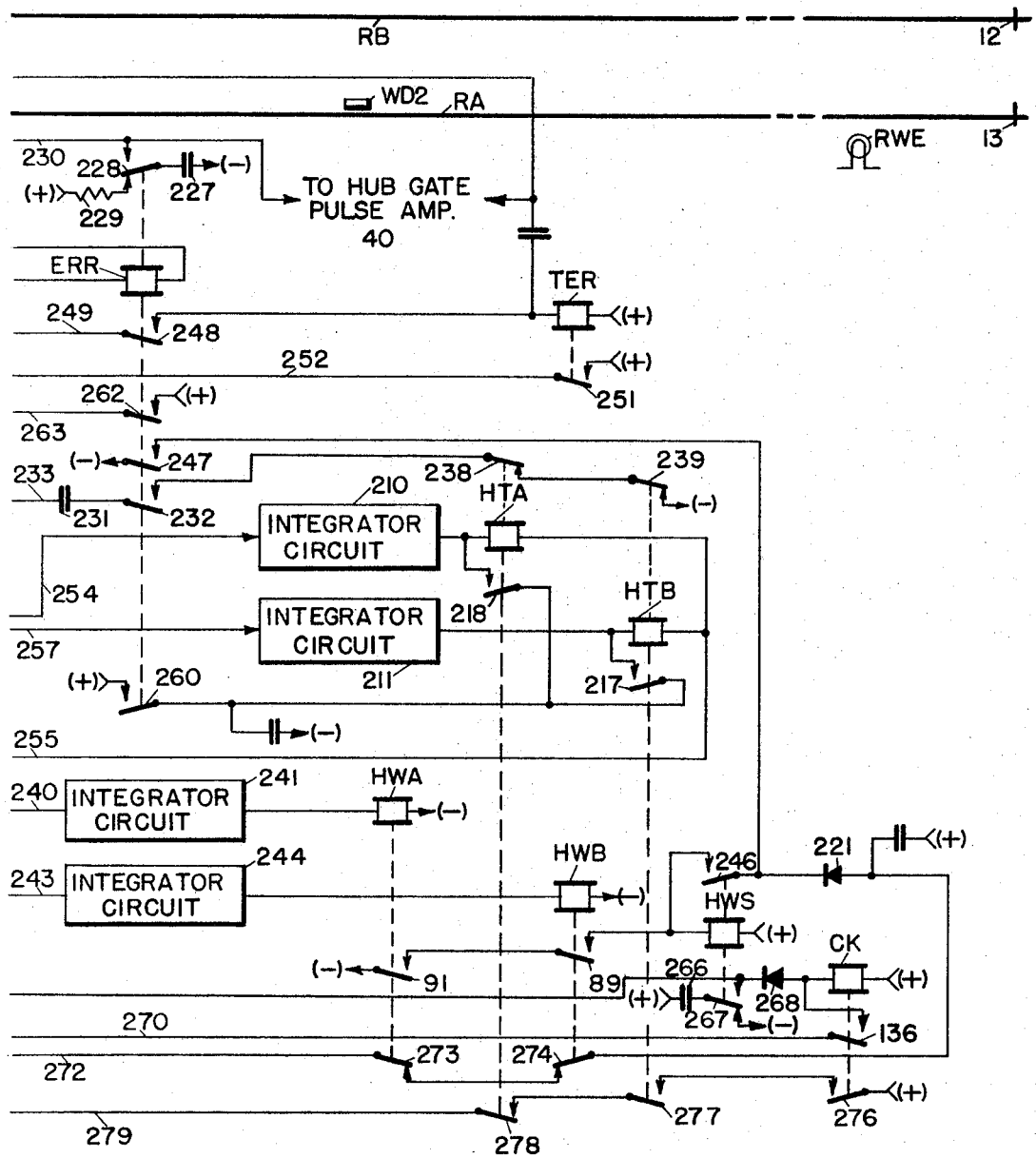

United States Patent Office 3,313,933
Patented Apr. 11, 1967

3,313,933
INTEGRITY CHECK FOR HOT BOX DETECTOR
Henry C. Sibley, Spencerport, N.Y., assignor to
General Signal Corporation
Filed Sept. 19, 1962, Ser. No. 224,710
7 Claims. (Cl. 246—169)

This invention relates to a system for detecting hot bearings on railway vehicles, and more particularly pertains to a system for checking a hot bearing detector just prior to the passage of one or more railway cars.

The use of hot bearing detectors for railway cars, has brought to the attention of railway personnel numerous bearings which were potentially dangerous from an accident standpoint. The provision of such information has also made maintenance personnel more alert to the proper maintenance of the journal bearings on cars. Thus, the railroads are placing more dependence on the effectiveness of the detectors. However, such hot bearing detectors set idle for substantial periods between the passage of successive trains and there has been no way of knowing whether or not they are in an operative condition during the passage of any particular train.

The present invention proposes to provide apparatus in connection with each hot bearing detector for simulating a hot journal bearing signal upon the approach of a train. In this way, the reliability of a hot bearing detector is established by its response to a simulated signal just prior to the passage of each train.

In accordance with the present invention, it is proposed to produce a momentary infrared checking signal of a suitable level to simulate a hot bearing. The provision of such an infrared checking signal provides a way of checking the entire detection system including the infrared responsive cell as well as the various amplifiers and other apparatus involved.

Such a checking signal is produced by positioning a small incandescent lamp on the movable shutter which protects the infrared responsive cell from outside disturbances while no train is present. One form of hot bearing detector structure using such a protective shutter has been disclosed in my pending application Ser. No. 7,727 filed February 9, 1960 now Patent Number 3,183,350.

When such a checking signal or simulated hot bearing signal results in the detection of a fault in the hot bearing detector structure, then a warning signal is given to the train personnel the same as if a hot bearing were located. On the other hand, if the hot bearing detector structure functions properly, then no warning signal is given unless there is a detection of a hot bearing.

The present invention proposes another feature to determine whether or not a train passing the hot bearing detector location along the wayside proceeds in a normal way or whether it actually stops and later proceeds. The system is then effective to make a record as to whether or not there is a train stoppage so that the record can be properly interpreted at a later time by train or maintenance personnel.

Another feature of the present invention provides suitable track presence detection so as to detect the approach of a train to cause the operation of the checking system and so as to detect whether or not a train has stopped adjacent the hot bearing detector location.

Another object of the present invention is to provide suitable recording means to make a record with regard to the various conditions of the detector system, as well as recording the detection of the relative bearing temperatures found in the bearings or journals of a passing train. This record may be made locally or it may be transmitted over suitable communication means to a distant central office.

Another object of this invention is to provide a system conditioned according to detected train presence to cause transmission of indication and control signals from the wayside to a distantly located central office.

Another object of this invention is to provide a system responsive to train presence for providing distinctive indications on each occurrence of train stoppage adjacent the detector device.

Other objects, purposes and characteristic features of this invention will be in part obvious from the accompanying drawings and in part pointed out as the description of the invention progresses.

To simplify the illustrations and facilitate in the explanation, the various parts and circuits constituting the embodiments of this invention have been shown diagrammatically and certain conventional illustrations have been employed, the drawings having been made to make it easy to understand the principles and mode of operation rather than to illustrate the specific construction and arrangement of parts that might be used in practice. The various relays and their contacts are illustrated in a conventional manner, and the symbols (+) and (—) are used to indicate connections to the terminals of batteries, or other sources of current, instead of showing all of the wiring connections to such terminals, and a symbol for a ground connection is used to indicate a connection to a terminal intermediate that of the (+) and (—).

In describing the invention in detail, reference will be made to the accompanying drawings in which like reference characters designate corresponding parts throughout the several views, and in which:

FIGS. 1A and 1B when arranged with FIG. 1A respectively to the left of FIG. 1B is a combined block diagram and diagrammatical illustration of one embodiment of this invention;

FIGS. 2A and 2B are structural illustrations showing shutter positioning and lamp placement therewith for a detector device;

FIGS. 3A and 3B when arranged with FIG. 3A respectively to the left of FIG. 3B is a combined block diagram and diagrammatical illustration showing a second embodiment of this invention;

FIG. 4 is a combined block diagram and diagrammatical illustration showing a portion of the embodiment of FIGS. 3A and 3B employed with a communication system having a signal transmitting section and a signal receiving section;

FIG. 5 is a combined block diagram and diagrammatical illustration showing an alternate form of this invention employed with the signal transmitting section of the communication system shown in FIG. 4; and FIG. 6 diagrammatically illustrates an alternate circuit arrangement employable with the signal receiving section of the communication system shown in FIG. 4.

Referring now to FIGS. 1A and 1B, a stretch of track including two rails RA and RB is diagrammatically illustrated. The stretch of track is defined by insulated joints 10, 11, 12 and 13 and by a track circuit including track relay TR, a track battery 15 and a resistor 16. The track circuit functions in the usual manner to detect a passing train while within the defined stretch of track. Lying within the stretch of track comprising the block signal track section is a short section of track which is defined by insulated joints 5, 6, 7 and 8 and a track circuit including battery 17, resistor 18 and short track relay STR. The short section of track may be in the order of ninety feet so as to insure detection of a train having cars therein with long wheelbases; whereas, the block signal track section may be in the order of several thousand feet long.

Wires 25 and 26 are used to connect the ends of the main block signal track section in view of the presence of the short track section adjacent the wayside detector equipment. If the short track section is in the order of ninety feet while the main block signal track section is in the order of several thousand feed, such short track section will of course be shorter than the usual train which will maintain the main track section shunted while the train is present.

A radiometer detector RD1 is located adjacent rail RB while a similar radiometer detector RD2 is located adjacent rail RA within the short section of track. Each of these radiometer detectors RD1 and RD2 is positioned to view or scan in the direction designated by dotted lines 9, i.e. substantially normal to respective rails RA and RB. The detection of each wheel which passes the location of radiometer detectors RD1 and RD2 is accomplished by wheel detector WD1 which is normally connected to rail RA as shown, while a second wheel detector WD2 is located to the right of wheel detector WD1 on rail RA a distance of approximately nine feet, both wheel detectors WD1 and WD2 being employed to count locomotives and/or railway cars as will be hereinafter more fully described.

Each of the radiometer detectors RD1 and RD2 is of the type shown and described in my pending application, Ser. No. 7,727, filed on February 9, 1960, as mentioned above. As disclosed therein, and described briefly, each radiometer detector includes an optical system comprising a reflecting element for focusing the heat radiation from a passing wheel onto an infrared sensitive element so that an electrical output signal is obtained therefrom which is proportional in amplitude to the varying heat radiated from the object viewed or scanned. Included with each radiometer detector is a shutter element S which is normally closed or in a blocking position for protecting the optical system from extraneous infrared energy such as solar energy, but which is operated to a nonblocking position by the successive operation of wheel detector WD1 by passing wheels as will be described.

In order to attain the objectives of this invention, a modification is made to the structure of each radiometer detector as shown and described in the pending application Ser. No. 7,727 mentioned above. As described above, a lamp is provided in order to establish the simulated hot signal condition representing a hot journal bearing condition. The infrared energy emanated from the lamp when energized is focused onto the infrared sensitive element or detector cell by positioning the lamp on a shutter S as shown particularly in FIGS. 2A and 2B. Referring to FIGS. 2A and 2B, a lamp 20 is shown attached to a shutter S by means of screws 21. Control energy is supplied to lamp 20 over wires 22 as will be subsequently described herein. In FIG. 2B, shutter S is shown to be positioned on a backing plate 23 and attached thereto through a solenoid 24 controlled to cause rotary movement of the shutter S from a blocking position as shown in solid lines to a nonblocking position as shown in dotted lines.

Each of the wheel detectors WD1 and WD2 is a track instrument of the electromagnetic type which is normally affixed to the track rail or rails. Each wheel detector WD1 or WD2 provides a signal output for the passage of each wheel of a car or train as it passes the radiometer detectors RD1 and RD2. The particular track instrument diagrammatically illustrated in FIGS. 1A and 1B and FIGS. 3A and 3B which has been found to work well in practice employs a permanent magnet with an associated iron core coil affixed to the track rail at a preselected location. One such track instrument of the electromagnetic type has been shown in the prior Patent No. 1,702,997, granted February 19, 1929; but it will of course be understood that various modified forms of this disclosure may be employed. In operation, as the flange of each wheel passes through an inductive coupling relationship made with the coil, there is a distinctive change in the flux which is provided by the permanent magnet and which links with the turns of the coil. As a result, a voltage is induced in the coil, and this voltage is applied to associated electronic circuits and acts thereon to cause a distinctive output pulse of uniform amplitude to be supplied therefrom to the associated gating circuits.

The low level signal outputs from the radiometer detectors RD1 and RD2 representing different journal temperature conditions are employed with various electronic circuits represented by block diagrams, and detailed circuits while the output pulses derived from wheel detectors WD1 and WD2 representing wheel positioning are employed with various gating circuits shown in block diagram. The organization of the detailed circuits shown herein in block diagram are disclosed more fully in the pending application, Ser. No. 110,528, filed on May 16, 1961, now Patent Number 3,177,359. No claim is made herein to that disclosed in such application Ser. No. 110,528 but a brief description is in order that a better understanding of the present invention can be attained.

Referring particularly to FIG. 1A, it is seen that the output signals for each of the radiometer detectors RD1 and RD2 are supplied to a number of serially connected circuits. More particularly, for radiometer detector RD2 positioned adjacent rail RA, each output signal thereof being a low level unidirectional output voltage is applied to a voltage signal preamplifier 27 where it is initially amplified with the amplified output being taken therefrom and applied to a voltage signal amplifier 28 where it is further amplified. Voltage signal amplifier 28 includes an adjustment circuit employed for the purpose of establishing the desired gain thereof. Each amplified output from voltage signal amplifier 28 is supplied to a hub signal storage circuit 29 where it is stored for a predetermined time determined by the gating circuits to be descirbed hereinafter. Each amplified output stored is then employed to operate an analog pen No. 2 in an analog recorder 30 and is also supplied to a pulse height detector 31 including an adjustment circuit which is employed to determine the height of each received amplified signal previously stored which is useable and indicative of an overheated journal bearing condition. Any output supplied from pulse height detector 31 is supplied to flip-flop 32 which is operated thereby from a first condition to a second condition wherein a digital output signal is provided until such flip-flop is restored to such one condition.

The above description of circuits has been given with reference to radiometer detector RD2. For radiometer detector RD1 positioned adjacent rail RB, similar circuits are provided as shown in FIG. 1A to accomplish similar functions as those described above for each low level unidirectional output voltage signal supplied from radiometer detector RD1. The circuits for radiometer detector RD1 corresponding to those circuits described above for radiometer detector RD2 have the reference characters 34, 35, 36, 37 and 38.

The above described circuits become effective to store and use an amplified signal according to an output gating pulse of predetermined width being supplied from wheel detector WD1 for actuating the hub gate pulse amplifier 40 and the flip-flop 41. This flip-flop 41 provides a gating pulse of a predetermined duration such as three milliseconds; which is the appropriate length of time for the radiometers to view the hubs as the wheels pass. Although different locations on the journal box may be viewed by the radiometer in order to detect the temperature conditions of passing journal boxes, it is assumed that the radiometer herein is viewing the hubs of the wheels as disclosed in my prior copending application Ser. No. 7,727, filed February 9, 1960. In addition, this pulse of predetermined width is employed to operate a pulse stretching circuit which is effective to then provide a pulse of longer duration for controlling the time of use of the then stored signals which are representative of signal outputs from radiometer detector RD1 and/or radiometer detector RD2.

Referring to FIGS. 1A and 1B, each output gating signal from wheel detector WD1 is supplied to hub gate pulse amplifier 40 provided for amplifying such signal. An amplified gating signal is then supplied to a flip-flop 41 which is initially controlled thereby for providing a distinctive output signal of approximately three milliseconds in duration, which is supplied over wire 43 to hub signal storage circuits 29 and 36 for causing these circuits to effectively store signal outputs received from respective radiometer detectors RD1 and RD2 for a period of three milliseconds which are representative of journal bearing temperatures. The output signal from flip-flop 41 is also supplied to a hub gate pulse stretching flip-flop 44 provided to lengthen the width of such output signal to approximately thirty milliseconds. The lengthened output signal is supplied over wire 45 and through a diode 46 to circuits 29 and 36 where it is used to effect control thereof for permitting stored signals, if any, to be used with an analog recorder 30 and pulse height detectors 31 and 37, respectively. In addition, the lengthened output signal is supplied to a switch and relay control circuit 48 for controlling a relay R.

Relay R is controlled by an output from the switch and relay control circuit 48 as it receives signals from flip-flop 44. That is, as a train passes the radiometer detector location in either direction, flip-flop 44 is operated for each passing wheel to a condition wherein it provides the required gating voltage signal for operating circuit 48 thus insuring that relay R is energized for each passing wheel. To insure that relay R remains energized at least for a predetermined period following the operation of flip-flop 44 to its nongating condition, a capacitor 50, which is normally charged through back contact 51 of relay R and a resistor 52, is effective to control circuit 48 and thereby hold relay R energized for such predetermined period. Thus, for a train that passes the radiometer detector location without stopping, relay R remains continuously actuated, while for a train that stops in the vicinity of the radiometer detector location, relay R is deenergized in a short period of time which may be in the order of seven seconds following the passage of the last wheel over wheel detector WD1. Relay R operated as described functions to control several different circuits in accordance with whether or not a train stops to be described hereinafter.

Generally speaking, output signals provided by wheel detectors WD1 and WD2 each being representative of a passing wheel are effective to control counting circuits for providing control gating signals representing the last axle for each railway car and a car count pulse for each railway car as shown and described in the above mentioned application, Ser. No. 110,528. Such control gating signals are employed respectively to control flip-flops 32 and 38 from their second conditions to their first conditions and to control count recording apparatus in a digital recorder 54.

In FIG. 1B, such counting circuits are shown in block diagram in association with wheel detectors WD1 and WD2. Referring thereto, and with respect to wheel detector WD1, each output gating signal derived from flip-flop 44 is supplied to a trigger generator 56 where it is inverted and shortened in duration to approximately 300 microseconds and thereafter supplied to a reversible counter 57 over one of two inputs according to an existing operating condition of a direction flip-flop 58. In either of two operating conditions of flip-flop 58, a biasing circuit is provided which causes each output signal supplied from generator 56 to be effective for controlling counter 57 to register a count in either a forward or reverse direction.

With respect to wheel detector WD2, each output gating signal provided thereby representing a passing wheel is supplied to an amplifier 60 where it is amplified and then supplied to an amplifier and pulse width control 61. The function of control 61 is to further amplify such signal and to determine the pulse width thereof which is characteristic of a passing wheel and to exclude all imposed signals occurring from extraneous sources. To insure that the extraneous signals which may occur after a signal of proper width is accepted which is characteristic of a passing wheel, the first output signal of proper width derived from control 61 is supplied to a one-shot multivibrator 62 which is controlled from a first condition to a second operating condition for approximately thirty milliseconds thus excluding any extraneous signals picked up thereafter by wheel detector WD2. An output signal is taken from multivibrator 62 and supplied to a trigger generator 63 where it is inverted and shortened in duration to approximately 300 micorseconds, similar to that described above for trigger generator 56. The signal derived from generator 63 is supplied to a reversible counter 64, and more particularly, to one of two inputs according to an existing operating condition of a direction flip-flop 65. In one operating condition of direction flip-flop 65, counter 64 is controlled by each such signal to count in a forward direction, while in a second operating condition of flip-flop 65, counter 64 is controlled by each such signal to count in a reverse direction.

A reverse reset control 67 is effective when counters 57 and 64 come into coincidence in at least one instance as to their registered counts for controlling respective flip-flops 58 and 65 to respective operating conditions where reverse operation of counters 57 and 64 becomes effective. Also, separate control of counters 57 and 64 to a zero count registering position causes respective control of flip-flops 58 and 65 such that forward operation of counters 57 and 64 becomes effective.

It has been mentioned above, that the distance between wheel detectors WD1 and WD2 is approximately nine feet. According to this distance, it is obvious that two wheels on a two wheel three wheel truck would be effective to actuate either wheel detector WD1 or wheel detector WD2 before actuating the other wheel detector according to the direction of a passing train. Irrespective of the direction, however, direction flip-flop 58 functions to provide a last pulse to control last axle pulse control 69 when the last axle of a railway car is detected as passing wheel detector WD1. Such last axle pulse is supplied from control 69, over a wire 70, through pulse delay 71 to flip-flops 32 and 38 for causing such flip-flops 32 and 38 to be controlled to a first operating condition provided an overheated journal bearing condition has been detected on respective sides of a particular car to cause operation thereof from a first condition to a second operating condition. Pulse delay 71 as included functions to provide the necessary time to allow the electronic circuits to complete their operation if a hot element was detected on the east wheel of a car. This pulse delay is indicated to be approximately twenty-five milliseconds, but it should be understood that this delay could be altered to meet various traffic conditions which may arise.

With direction flip-flops 58 and 65 being conditioned, i.e., after all the wheels on a first truck for a railway car or locomotive have passed both wheel detectors WD1 and WD2 to cause counters 57 and 64 to register coincident counts thereon, an output pulse is derived from flip-flop 65 and supplied to car count pulse control 73 effective thereupon to produce an output signal of approximately fifty milliseconds in duration which is supplied to digital recorder 54 for car counting purposes.

Digital recorder 54 functions to provide a printed output as to time that a train enters the defined detection zone, the number of cars within the train having a detected hot journal bearing coupled with the time of detection, and the time coupled with the number of cars in the train when it leaves the detection zone, all as described in the above mentioned pending application Ser. No. 110,528. To establish a time, positive (+) energy is supplied through a front contact 75 controlled by time clock 76 to digital recorder 54.

In response to the control provided by relays TR, STR and R according to train presence and train movement, respectively, and output signals provided by radiometer detectors RD1 and RD2, other relay circuits are controlled in a manner to provide distinctive indications of the operating condition of the detection system. More particularly, track repeater relays TR1 and TR2 are provided responsive to the control of track relay TR for producing the simulated hot journal bearing signals, while stick relay RS is responsive to the control of relay R for further indicating train movement according to the position of relay STR.

Relays HWA and HWB respectively associated with pulse height detectors 31 and 37 are controlled in response to outputs from 31 and 37 representative of hot journal bearing temperatures. A hot wheel stick relay HWS is energized by the coincident energization of relays HWA and HWB. Check relays CK and CK1 respond to relay HWS to provide control of the warning relay WR, which warning relay when picked up causes the lamps LWE and RWE to be illuminated. Relays CK and CK1 also control the actuation of the recorder 54 under certain conditions later to be explained. As shown in FIGS. 1A and 1B, lamps LWE and RWE are positioned along the wayside at opposite ends of the stretch of track. These lamps, as located, are provided for giving indications to train personnel, but may be located elsewhere as desired. A hot wheel stop stick relay HWSS functions to reestablish the checking circuit when the train stops only after a hot journal bearing has been detected in order to provide a recording of each hot journal bearing thereafter detected while still controlling lamps LWE and RWE.

The circuits shown and generally described for FIGS. 1A and 1B have been organized so as to control the warning lamps LWE and RWE according to train presence where the detection system is either in an inoperative condition or in an operative condition. In addition, analog recorder 30 is controlled according to the control of hub signal storage circuits 29 and 36 and flip-flop 32 and 38, while digital recorder 54 is controlled to provide indications according to the control of flip-flops 32 and 38, check relays CK and CK1, relays R and RS and relay TR1 in combination with stop light circuits.

It is believed that the nature of the invention, its advantages and characteristic features can be best understood with further description being set forth from the standpoint of typical operations relative to the condition of the detection system with respect to train detection and movement.

INOPERATIVE CONDITION OF DETECTION SYSTEM

In the detection system described, the malfunction of a circuit or component therein may be sufficient to cause the system, as a whole, to be inoperative. For purposes of description herein, let it be assumed that the relay HWA remains inoperative even though a simulated hot journal bearing signal is applied thereto from pulse height detector 31.

According to the above assumption, and assuming a train enters the stretch of track defined by the track circuit including track relay TR, relay TR is deenergized in the usual manner. Upon deenergization of relay TR, several conditions occur to establish simulated hot journal bearing signal conditions so as to check the detection system for operability prior to train passage.

Upon release of relay TR, an energizing circuit is completed for relay TR2 which extends from (+), through back contact 78 of relay TR1, through back contact 79 of relay TR through the winding of relay TR2, to (−) thus energizing relay TR2. A capacitor 81 has its charging circuit completed through back contact 82 of relay TR2 during the deenergized condition thereof and a resistor 83, but upon energization of relay TR2, capacitor 81 is discharged through front contact 82 of relay TR2 over wire 84, through lamps 20 included with radiometer detectors RD1 and RD2, to (−) causing energization thereof. Each radiometer detector then functions to provide an output signal characterizing a hot journal bearing which is then amplified by its associated pre-amplifier and amplifier and supplied to its associated hub signal storage circuit. The discharging circuit of capacitor 81 is also connected to flip-flop 41 through a diode 86 so as to cause flip-flop 41 to provide the three millisecond output gating signal which is supplied to the circuits 29 and 36 as well as to pulse stretching flip-flop 44. Flip-flop 44 functions in the normal manner to provide a thirty millisecond output gating signal which is supplied to hub signal storage circuits 29 and 36 over wire 45, and through asymmetric unit 46, as described. The circuits 29 and 36 provide output signals to analog pens No. 1 and No. 2 of analog recorder 30.

Moreover, circuits 29 and 36 pass stored signals to respective pulse height detectors 31 and 37, where each pulse is tested to determine whether or not it is representative of a hot journal bearing. If a pulse is sufficiently high, it causes a signal to be supplied therefrom to operate respective flip-flops 32 and 38. The output from detector 37 is effective to cause relay HWB to be energized, but according to that assumed above, the output from detector 31 is ineffective to cause relay HWA to be energized in that the apapratus controlling relay HWA has been assumed to have malfunctioned.

Since relay HWA remains deenergized, relay HWS also remains deenergized in that its energizing circuit when completed extends from (+), through front contact 89 of relay HWB, through back contact 90 of relay R, through front contact 91 of relay HWA, through the winding of relay HWS, to (−). In the normal deenergized condition of relay HWS, a capacitor 93 is charged through back contact 94 of relay HWS and a resistor 95. The charge on capacitor 93 is effective to cause relay CK to be energized only when relay HWS is energized in that the energizing circuit for relay CK includes front contact 94 of relay HWS and diode 96.

As the train moves through the stretch of track and its wheels pass over wheel detector WD1, relay R is energized according to the control of circuit 48 as described above. The shutter elements for detectors RD1 and RD2 are operated to a nonblocking position by a circuit extending from (+), through front contact 98 of relay R, over wire 99, to the shutter solenoids 24 in detectors RD1 and RD2. When relay R is initially energized, an energizing circuit is completed for warning relay WR which extends from (+), through front contact 100 of relay TR1, over wire 101, through front contact 102 of relay R, through back contact 103 of relay CK, through the winding of relay WR, to (−) causing relay WR to be energized. A circuit is then completed through front contact 105 of relay WR for energizing lamps LWE and RWE which remain energized as long as the relay WR is energized for giving a warning indication. Inasmuch as relay CK remains deenergized throughout the passage of the train through the section of track and as long as relay R is energized, lamps LWE and RWE remain energized. If, however, the train stops within the defined stretch of track and relay R deenergizes, a stick circuit is completed for relay WR which includes back contact 107 of relay R and front contact 108 of relay WR to insure that lamps LWE and RWE remain energized irrespective of train movement.

A circuit is completed upon energization of relay TR2 for resetting recorder 54 to a zero count registering position and extends from (+), through front contact 109 of relay TR2, to reset apparatus (not shown) included with recorder 54. In addition, a rest control pulse is supplied to reversible counters 57 and 64 through front contact 111 of relay TR2 for insuring that such counters 57 and 64 are in zero count registering positions.

Relay TR1 is indicated to be a slow pick up type relay which has its energizing circuit completed from (+), through back contact 110 of relay TR, through the winding of relay TR1, to (−). Initially, upon release of relay TR when the train enters the stretch of track, relay TR1 is energized after a limited time delay so as to permit relay TR2 to be energized as described to complete the circuit through its front contact 82 as described. However, energization of relay TR1 disconnects the energizing circuit for relay TR2 which includes back contact 78 of relay TR1 to thereby interrupt the discharge circuit described for capacitor 81.

According to the operation of relay TR1, digital recorder 54 is operated to provide prints of the existing car counts when the train enters the defined stretch of track and also when the train leaves the defined stretch of track so as to indicate the presence of such train. More particularly, capacitor 113 normally charged through back contact 114 of relay TR1 and a resistor 115 is discharged through front contact 114 of relay TR1 and a diode 116 to a count print solenoid (not shown) included with digital recorder 54 to cause a print of the existing zero count registration when a train enters the track section. During the energized condtion of relay TR1, a capacitor 118 is charged through front contact 119 of relay TR1 and a resistor 120. Upon release of relay TR1, i.e., when the train leaves the defined stretch of track, capacitor 118 is discharged through back contact 119 of relay TR1 and diode 121 to digital recorder 54 to cause a print of the existing count according to the number of locomotives and railway cars registered.

The operation of relays R and RS when relay STR is operated causes digital recorder 54 to operate to provide a car count print representative of train stoppage. More particularly, while the train is moving, relay R is energized as long as wheels pass over wheel detector WD1 and for a limited time thereafter. When relay R is picked up, a circuit is completed for energizing stick relay RS which extends from (+), through front contact 123 of relay R, through the winding of relay RS, to (−). With relays R and RS being energized, a capacitor 122 is charged through a circuit extending from (+), through resistor 153, through front contact 125 of relay RS, through front contact 126 of relay R, through capacitor 122, to (−). Upon release of relay R and before relay RS releases (indicative of train stoppage), capacitor 122 is discharged to print solenoids (not shown) included with recorder 54 through back contact 137 of relay R, through front contact 139 of relay RS, through back contact 153 of relay STR to cause a print of the existing car count registration. This operation occurs each time the train stops and relay STR is dropped away. To further indicate that the system is inoperative, a capacitor 186 charged through resistor 187 and back contact 188 of relay STR is discharged through front contact 188 of relay STR and back contact 189 of relay CK1 to recorder 54 for causing car count prints to be made when relay STR is picked up after train passage.

Another circuit is completed for maintaining relay TR1 energized which includes front contact 124 of relay RS. It is here recognized that the wheel detector WD1 could be positioned adjacent one end of the stretch of track and near the insulated joints such that the train could leave the track section to cause relay TR to be energized and relay TR1 to be deenergized before all of the circuit functions dependent on front contacts thereof were completed.

OPERATIVE CONDITION OF DETECTION SYSTEM

If it is assumed in the present example that a train enters the defined stretch of track as described above and that the detection circuits function as described to cause the simulated hot journal bearings to be provided and further that the system functions properly, relays HWB and HWA are energized concurrently so as to complete the energizing circuit for relay HWS. With relay TR1 now energized, a stick circuit is completed for relay HWS which extends from (+), through front contact 127 of relay TR1, over wire 128, through front contact 129 of relay HWS, through the winding of HWS, to (−).

When relay HWS is initially energized, capacitor 93 is discharged through front contact 94 thereof, through diode 96, and through the winding of relay CK to cause energization thereof. Relay CK has a stick circuit completed from (+), through front contact 131 of relay TR1, over wire 132, through a resistor 133, through back contact 134 of relay HWA, through back contact 135 of relay HWB, through front contact 136 of relay CK, through the winding of relay CK, to (−). This circuit is obviously completed when relays HWA and HWB are deenergized. Upon energization of relay CK, an energizing circuit for relay CK1 is completed from (+), through front contact 138 of relay CK, through the winding of relay CK1, to (−). When thus energized, a stick circuit is completed from (+), through front contact 141 of relay R, through front contact 140 of relay CK1, to (−). This, of course, depends upon the energization of relay R and a passage of wheels on the passing train by wheel detector WD1 as described. A capacitor 142 charged through front contact 131 of relay TR1 insures proper sticking of relay CK.

With relay CK being energized, the output circuits of flip-flops 32 and 38 are connected to digital recorder 54 through front contacts 143 and 144 of relay CK respectively. Although flip-flops 32 and 38 were initially operated from a first operating condition to a second operating condition by the simulated hot journal bearing signal, a circuit is completed when relay HWS is energized and before relay CK is energized to operate flip-flops 32 and 38 back to a first operating condition. This circuit extends from (−), through back contact 146 of relay CK, through front contact 147 of relay HWB, through front contact 148 of relay HWA, through front contact 149 of relay HWS, to flip-flops 32 and 38. Thus flip-flops 32 and 38 are operated from a second operating condition to their first operating condition prior to the energization of check relay CK.

As the train passes the detector location, relay R is energized in the manner described above to cause its front contact 102 in the energizing circuit for relay WR to close. However, contact 103 of check relay CK is now open such that the energizing circuit for relay WR is not completed. Relay WR thus remains deenergized during the passage of the train through the defined stretch of track, thus causing the lamps LWE and RWE also to remain deenergized for indicating to train personnel that the detection system is operative and that no hot journal bearings were detected.

If, however, it is assumed that at least one hot journal bearing is detected on the train passing through the defined stretch of track, as for example, on the fourth railway car within the train on the right side thereof, relay HWB is energized thereby disconnecting the stick circuit for check relay CK which includes back contact 135 of relay HWB. The dropping of relay CK closes the energizing circuit for relay WR through back contact 103 of relay CK to energize relay WR. Lamps LWE and RWE are thus energized through front contact 105 of relay WR. A stick circuit is completed for relay WR extending from (+), through front contact 150 of relay CK1, through front contact 108 of relay WR, through the winding of WR, to (−).

After the release of relay CK, the output circuits of flop-flops 32 and 38 are connected respectively through front contacts 151 and 152 of relay CK1, through back contacts 143 and 144 of relay CK, and over wires 154 and 155 to digital recorder 54. Thus, digital recorder 54 is operated to provide a permanent print of each railway car numbered within the train having a hot journal bearing which is detected subsequent to the detection of a first hot journal bearing, while lamps LWE and RWE continue to be energized.

If, instead of having a hot journal bearing, the train passing through the stretch of track stops at least once, relays R and RS are operated as described so as to cause digital recorder 54 to provide a print indicating the stopped condition of the train relative to the car adjacent the detector location. In addition, stop light indication circuits are energized to visually indicate the number of times that the train stopped adjacent the detector location.

More particularly, as the train passes through the defined stretch of track causing relays R and RS to be energized, capacitor 122 is charged by the circuit described above. When relay R releases signifying the stoppage of the train and before relay RS releases, a discharge circuit is completed to the count print solenoid inputs of digital recorder 54 from capacitor 122 as described above. Thus, a permanent recording is made of the existing count registration for both detector channels "A" and "B" during each train stoppage.

In addition, relay SER has its energizing circuit completed also from capacitor 122 which further extends through back contact 156 of relay STR, through diode 157, through the winding of relay SER, to (−). When energized, a stick circuit extends from (+), through back contact 159 of relay STR, through front contact 166 of relay SER, through the winding of relay SER, to (−). Stop light SE is then energized by a circuit extending from (+), through front contact 173 of relay SER, through light SE, to (−). Light SE remains energized until the train leaves the detection location and relay STR is again energized.

Upon release of relay R and before relay RS releases, a circuit is completed for re-establishing the simulated hot journal bearing signals by energizing lamps 20 in radiometer detectors RD1 and RD2. More particularly, a capacitor 160 normally has its charging circuit completed through back contact 161 of relay TR1 and resistor 162 during the deenergizing condition of relay TR1. After the train enters the stretch of track and stops therein, the positive (+) side of capacitor 160 is connected to lamps 20 in radiometer detectors RD1 and RD2 through back contact 163 of relay TR2, through front contact 164 of relay RS, through back contact 165 of relay R and over wire 84. According to the energization of lamps 20, a simulated hot journal bearing signal is passed through each of the radiometer detector channels "A" and "B" so as to energize relays HWA and HWB. The stick circuit for relay CK including back contact 134 of relay HWA and back contact 135 of relay HWB is thus disconnected. However, according to the counting positions of reversible counters 57 and 64, a positive (+) pulse is supplied from either counter 57 through diode 167 or from counter 64 through diode 168 or both, over wire 169, through back contact 170 of relay R, through front contact 136 of relay CK, through the winding of relay CK, to (−) to stick relay CK until such time as the relays HWA and HWB are released.

As the train starts to move and a wheel passes wheel detector WD1, a gating signal is produced to control relay R to an energized condition. When energized, the stick circuit for relay CK1 including front contact 141 of relay R is again completed. In addition, a circuit is completed for operating flip-flops 32 and 38 from their second operating condition to a first operating condition which extends from (+), through back contact 172 of relay RS, through front contact 171 of relay R, through front contact 149 of relay HWS, to the input gating circuits of flip-flops 32 and 38.

The detection of a hot journal bearing following the stoppage of the train operates the circuits including check relay CK and warning relay WR and lamps LWE and RWE to provide indications to train personnel as described above.

If it is assumed that a hot journal bearing is detected, as the train passes through the stretch of track prior to at least one stop within the vicinity of the detector location, the hot wheel stop stick relay HWSS is controlled to re-establish the control of check relay CK when the simulated hot bearing signal is established according to the release of relay R as described. More particularly, check relay CK is released upon detecting a hot journal bearing in the manner described above to thereby cause relay WR to be energized for energizing lamps LWE and RWE as described. In order to maintain digital recorder 54 responsive to outputs provided by flip-flops 32 and 38, relay CK is again energized, but relay WR and lamps LWE and RWE are maintained energized respectively so as to maintain existing warning indications.

As described above, the lamps 20 in radiometer detectors RD1 and RD2 are energized according to the discharge of capacitor 160 when relay R releases, thus causing relays HWA and HWB to be energized concurrently. With relay CK released and before relay RS releases, a circuit is completed for energizing relay HWSS which extends from (+), through front contact 174 of relay RS, through back contact 175 of relay CK, through front contact 176 of relay HWB, through front contact 177 of relay HWA, through front contact 178 of relay HWS, through the winding of relay HWSS, to (−). With relay R released, a stick circuit for relay HWSS extends from (+), through back contact 180 of relay R, through front contact 181 of relay HWSS, through the winding of HWSS, to (−).

A capacitor 183 is normally charged through back contact 184 of relay HWSS in its deenergized condition and a resistor 185, but has its discharge circuit completed through front contact 184 of relay HWSS, through diode 96 and through the winding of relay CK to energize such relay CK. Thus, relay CK is again energized even though a hot journal bearing has been detected when the train stops so as to energize relay CK1 and thereby hold relay WR energized until such time as the train leaves the defined stretch of track.

FIGS. 3A and 3B show a second embodiment wherein overlay type track circuits are employed to provide train presence detection in lieu of the D.C. track circuits shown and described in connection with FIGS. 1A and 1B. The lamps LWE and RWE are controlled in FIGS. 3A and 3B according to the operation of a short range overlay track circuit and hot test relays HTA and HTB as well as check relay CK to provide indications of proper operation of the system. In addition, a time delay relay TER is employed to gate flip-flops 32 and 38 subsequent to operation thereof by the simulated hot journal bearing signals.

Referring to FIGS. 3A and 3B, the entrance of a train into the defined stretch of track including rails RA and RB is detected by the operation of an extended range relay ERR which is controlled according to the response of a transceiver 222 which is operated at a predetermined frequency as governed by tuning unit TU1 including coil 223 and capacitor 224. Also, a variable resistor 225 is employed to govern the operation of relay ERR.

A capacitor 227 is charged normally through a back contact 228 of relay ERR and through a resistor 229, but in the energized condition of relay ERR, capacitor 227 is discharged through front contact 228 of relay ERR, over wire 230 and through lamps 20 in radiometer detectors RD1 and RD2 so as to energize such lamps thereby establishing a hot journal bearing signal. In addition, capacitor 227 is discharged to hub gate pulse amplifier 40 so as to establish the three millisecond gating signal described above.

The voltage signal pre-amplifiers 27 and 34 act to initially amplify the simulated hot journal bearing signals and pass them to respective amplifiers 28 and 35 where they are further amplified as described above. With relay ERR being energized, a capacitor 231 has two energizing circuits completed to the outputs of amplifiers 28 and 35. For amplifier 28, the charging circuit for capacitor 231 extends from the (+) output of amplifier 28, through resistor 235, through back contact 234 of relay RS, over wire 233, through capacitor 231, through front contact 232 of relay ERR, through back contact 238 of relay HTA, through back contact 239 of relay HTB, to (−), while the other charging circuit extends from the (+) output of amplifier 35, through a resistor 237, through back contact 236 of relay RS, and to wire 233. Thus, capacitor 231 is charged according to the simulated hot journal signal provided by amplifiers 28 and 35.

The simulated hot journal bearing signals are respectively passed to storage circuits 29 and 36 where they are stored momentarily and then passed to respective detectors 31 and 37 according to the control provided by discharge of capacitor 227 to the gating inputs of circuits 29 and 36 respectively. Each of the detectors 31 and 37 acts to provide an output which is employed to operate flip-flops 32 and 38 in the manner described above for operating digital recorder 54 as indicated. In addition, the outputs from detectors 31 and 37 control the operation of hot wheel relays HWA and HWB as described above, but an integrator circuit is employed here to shape the signal from the detector so as to insure proper operation of the relay. More particularly, the output signal from detector 31 is supplied over wire 240 to an integrator circuit 241 where it is shaped and then used to energize a relay HWA. The output signal from detector 37 is supplied over wire 243 to an integrator circuit 244 where it is shaped and then used to energize relay HWB.

With relays HWA and HWB concurrently energized, the energizing circuit for relay HWS including front contact 89 of relay HWB and front contact 91 of relay HWA is completed for energizing relay HWS. A stick circuit is then completed for relay HWS which extends from (+), through the winding of relay HWS, through front contact 246 of relay HWS, through front contact 247 of relay ERR, to (−).

When relay ERR is initially energized, an energizing circuit is completed for time element relay TER which extends from (+), through the winding of relay TER, through front contact 248 of relay ERR, over wire 249 through back contact 250 of relay R, to (−). Time element relay TER functions, however, to remain deenergized for a time delay sufficient that the detector channels "A" and "B" are operated to the extent that flip-flops 32 and 38 are each operated to their second operating condition provided the detector system is operative. After a limited time delay, relay TER is energized by such circuit causing a circuit to be completed for operating flip-flops 32 and 38 to their first operating condition which extends from (+), through front contact 251 of relay TER, over wire 252, to the gating inputs of flip-flops 32 and 38.

As the train approaches adjacent the detector location a short range overlay track circuit connected adjacent the detector location on rails RA and RB is operated. Such track circuit includes a transceiver 284 which is operated at a predetermined frequency as governed by tuning unit TU2 including coil 285 and capacitor 286. The operation of a transceiver 284 thus causes an energizing circuit for a short range relay SRR to be completed for energizing such relay through a variable resistor 287.

Capacitor 231 charged in the manner described above by the simulated hot signal condition has a discharging circuit completed through each of the hot test relays HTA and HTB following the energization of short range relay SRR. For relay HTA, the energizing circuit extends from the positive side of capacitor 231, over wire 233, through back contact 234 of relay RS, through resistor 235, over wire 254, through integrator circuit 210, through the winding of relay HTA, over wire 255, through front contact 256 of relay SRR, to (−). Similarly, the energizing circuit for relay HTB extends from the positive side of capacitor 231, over wire 233, through back contact 236 of relay RS, through a resistor 237, over wire 257, through integrator circuit 211, through the winding of HTB, wire 255, through front contact 256 of relay SRR, to (−). In both circuits, the negative side of capacitor 231 is connected to (−) through front contact 232 of relay ERR and back contacts 238 and 239 of relays HTA and HTB respectively. A stick circuit is completed for each of the test relays HTA and HTB when energized. For relay HTA, a stick circuit extends from (+), through front contact 260 of relay ERR, through front contact 218 of relay HTA, winding of relay HTA, to wire 255; while for relay HTB, a stick circuit extends from (+), through front contact 260 of relay ERR, front contact 217 of relay HTB, winding of relay HTB, and to wire 255. Wire 255 is connected to (−) through front contact 256 of relay SRR.

As the train further approaches the detector location and the initial wheel thereof passes over wheel detector WD1, relay R is energized in the manner described above. Relay RS having its energizing circuit completed through front contact 123 of relay R is subsequently energized. A stick circuit is completed for relay RS extending from (+), through front contact 262 of relay ERR, over wire 263, through front contact 264 of relay RS, through the winding of relay RS to (−).

A capacitor 266 is charged through back contact 267 of relay HWS while deenergized, but is discharged through front contact 267 when relay HWS is energized as described above, through diode 268, through the winding of relay CK, to (+). With relay RS being energized as long as the train is within the defined stretch of track, the stick circuit for relay CK is maintained until a hot journal bearing is detected by either radiometer detector RD1 or RD2 to cause the corresponding hot wheel relay HWA or HWB to be energized. In the event that no hot journal bearing is detected, relay CK remains energized until the train leaves the track section. However, if a hot journal bearing is detected, the stick circuit for relay CK is released, thereby releasing relay CK. Capacitor 266 is fully discharged through front contact 265 of relay RS to insure proper release of relay CK.

Lamps LWE and RWE and digital recorder 54 are controlled according to the operation of check relay CK and depending upon the detection of the train by relay SRR. In the event that the passing train has no hot journal bearings detected and leaves the range of detection of relay SRR, a circuit is completed for energizing lamps LWE and RWE and also sending a signal to digital recorder 54 which extends from (+), through front contact 276 of relay CK through front contact 277 of relay HTB, through front contact 278 of relay HTA, over wire 279, through back contact 280 of relay SRR, through the filaments of lamps LWE and RWE, to (−), and to digital recorder 54. If, however, relay CK is released as a result of a detected hot journal bearing, then front contact 276 thereof is open causing lamps LWE and RWE to remain deenergized. Also, no positive (+) energy is provided for digital recorder 54 thus giving an indication of a train passing the detector location but having no hot journal bearings thereon. Alternately, lamps LWE and RWE and digital recorder 54 may be controlled through a front contact of relay SRR to provide positive indications as long as no hot journal bearing is detected.

Where it is desired to transmit information to a remote station, an organization may be employed as shown in FIG. 4. Referring to FIG. 4, wayside transmitting apparatus 190 may be controlled by wayside control apparatus 191 operated as described above so as to transmit the hot journal bearing information over a communication channel 192 to a remote station receiving apparatus 193 operative to translate such hot journal bearing signals for use with recorder control apparatus 194 and then digital recorder 54 where prints are provided of the car number and time relative to each hot journal signal received.

In addition, the wayside transmitting apparatus 190 is conditioned by the operation of track relay SRR and check relay CK to a "shift up" code condition and by the operation of track relay ERR to a "shift down" code condition which is transmitted over channel 192 and recognized by the remote receiving station apparatus 193. In brief, the transmission is by a carrier frequency which can be frequency modulated to "shift up" when the frequency is increased and to "shift down" when the frequency is decreased.

In operation, when the train enters the track section and relay ERR is picked up, the normal "shift down" condition is released in that negative (—) energy supplied to apparatus 190 through back contact 195 of relay ERR to provide the "shift down" code condition is interrupted. When check relay CK is energized and relay SRR is released as described, negative (—) energy is connected through back contact 196 of relay SRR and through front contact 197 of relay CK to apparatus 190 for providing the "shift up" code condition. It is noted here that both "shift up" and "shift down" code conditions are interrupted while a train is passing the detector location according to train detection.

At the remote station, the "shift down" negative (—) energy signal operates a track relay repeater ERR1 through a resistor 198. A capacitor 199 is also charged so as to control the release time of relay ERR1. The reset control mentioned in FIGS. 1A and 1B may be provided through front contact 202 of relay ERR1. The "shift up" negative (—) energy controls a check relay repeater CK2 through a resistor 201 and additionally energizes a capacitor 202 which is employed to control the release time of check relay CK2.

To indicate the conditioning of the detection system, a hot wheel relay WHR has its energizing circuit completed when check relay CK2 is energized and track relay ERR1 is deenergized and extends from (+), through front contact 203 of check relay CK2, through back contact 204 of track relay ERR1, through the winding of relay HWR, to (—). Assuming that no hot journals are detected, the check relay CK2 remains deenergized at least until the train leaves the short section of track as determined by the release of relay SRR. When energized, a hot journal lamp HJE is caused to be energized by a circuit extending from (+), through front contact 206 of relay HWR, through the filament of lamp HJE, to (—) thereby indicating the operative condition of the detection system with no detected hot element. A comparison of the "dark" condition of lamp HJE and the operation of digital recorder 54 will, however, indicate the inoperative condition of the detection system or the detection of a hot element.

Where it is desired to maintain the hot journal indication lamp HJE energized until the passing train moves into a particular section of track where, for example, a repair station is located, a stick circuit may be provided for relay HWR which includes a front contact 207 of the track relay for that stretch of track which is indicated to be relay 1TR. Such stick circuit then extends from (+), through front contact 207 of relay 1TR, through front contact 208 of relay HWR, through the winding of relay HWR, to (—). When the train reaches such stretch of track and relay 1TR releases, the relay HWR also releases to cause deenergization of lamp HJE.

Referring to FIG. 5, the two hot test relays HTA and HTB are provided to further condition the control of the wayside transmitting apparatus 190 by the "shift up" negative (—) energy. Recalling that the voltage signal amplifiers 28 and 35 each includes a hot signal adjustment, relays HTA and HTB are then concurrently energized when the simulated hot journal bearing signal is introduced into the detection system. Inasmuch as each of the amplifiers 28 and 35 provides an analog signal output, the signal from amplifier 28 is fed through an integrator 210 for squaring purposes, while the signal from amplifier 35 is fed through integrator 211 also for squaring purposes.

"Shift up" negative (—) energy is supplied through back contact 196 of relay SRR, through front contact 197 of relay CK, through front contact 213 of relay HTB, through front contact 214 of relay HTA to the wayside transmitting apparatus 190 and over channel 192, to the remote receiving apparatus 193.

Referring to FIG. 6, the hot journal light HJE functions to provide a "dark" indication as long as hot wheel relay HWR is energized by the circuit described and provides a "light" indication according to the energization thereof when hot wheel relay HWR is released to close its back contact 220 thereby completing the energizing circuit for light HJE.

Having described two forms with modifications of a system for detecting hot elements on railway vehicles, as specific embodiments of the present invention, it is desired to be understood that these forms are selected to facilitate in the disclosure of the invention rather than to limit the number of forms which it may assume; and, it is to be further understood that various modifications, adaptations, and alterations may be applied to the specific forms shown to meet the requirements of practice, without in any manner departing from the spirit or scope of the present invention.

What I claim is:

1. A system for checking the integrity of wayside apparatus adapted for detecting hot journal bearings on cars passing said wayside apparatus comprising, car detector means responsive to a car approaching the wayside apparatus, check signal means responsive to said car detector means for generating a signal simulating a hot journal bearing and acting on said wayside apparatus, and check means controlled by the response of said wayside apparatus to said simulated signal for providing a distinctive manifestation prior to the passage of any journal of said cars past said wayside apparatus.

2. The system of claim 1 which further includes utilization means operatively connected to said wayside apparatus and being operated to a distinctive condition by each output of said wayside apparatus which is representative of a journal whose temperature exceeds a predetermined value, and means responsive to the failure of said check means to provide said distinctive manifestation in response to said simulated signal for prohibiting operation of said utilization means to said distinctive condition by the output of said wayside apparatus.

3. The system of claim 1 in which said check means produces a warning signal in the event said wayside apparatus does not respond to said simulated signal.

4. The system of claim 1 in which said check signal means includes a normally inactive source of infrared radiation in said wayside apparatus and means controlled by said car detector means for rendering said source momentarily active.

5. The system of claim 1 which further includes means responsive to the stoppage of a car adjacent said wayside apparatus for also generating said simulated signal.

6. The system of claim 1 in which said car detector means comprises a track circuit.

7. The system of claim 1 in which said car detector means comprises an overlay track circuit.

(References on following page)

References Cited by the Examiner

UNITED STATES PATENTS

| | | | |
|---|---|---|---|
| 2,617,921 | 11/1952 | Chu | 246—28 |
| 2,700,108 | 1/1955 | Shamos. | |
| 2,798,214 | 7/1957 | Rowell. | |
| 2,829,267 | 4/1958 | Howell | 246—169 |
| 2,856,539 | 10/1958 | Orthuber et al. | 246—169 |
| 2,963,575 | 12/1960 | Pelino et al. | 246—169 |
| 2,994,764 | 8/1961 | Witmer et al. | 246—28 |
| 3,159,747 | 12/1964 | Jones. | |
| 3,161,863 | 12/1964 | Deziel | 340—214 |
| 3,177,359 | 4/1965 | Bramer et al. | 246—169 |
| 3,197,623 | 7/1965 | Baughman | 246—169 |
| 3,235,723 | 2/1966 | Pelino | 246—169 |

ARTHUR L. LA POINT, *Primary Examiner.*

JAMES S. SHANK, EUGENE G. BOTZ, *Examiners.*

S. T. KRAWCZEWICZ, *Assistant Examiner.*